(12) United States Patent
Bess et al.

(10) Patent No.: US 6,513,867 B1
(45) Date of Patent: Feb. 4, 2003

(54) SUNROOF TROUGH MOLDED BUS BAR SYSTEM

(75) Inventors: Shelley L. Bess, Novi, MI (US); Graham Fishman, West Bloomfield, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/974,204

(22) Filed: Oct. 9, 2001

(51) Int. Cl.⁷ .................................................. B60J 7/00
(52) U.S. Cl. .................................. 296/216.08; 296/223
(58) Field of Search .......... 296/216.01, 216.06–216.08, 296/223

(56) References Cited

U.S. PATENT DOCUMENTS

| | | |
|---|---|---|
| 2,158,656 A | 5/1939 | Frank |
| 2,966,542 A | 12/1960 | Shields |
| 4,243,261 A | 1/1981 | Trenkler |
| 4,934,753 A | 6/1990 | Gajewski |
| 4,945,188 A | 7/1990 | Jackson |
| 5,543,581 A | 8/1996 | Kurata |
| 5,887,939 A | 3/1999 | Yamaguchi |
| 6,036,259 A * | 3/2000 | Hertel et al. ............ 296/216.01 |
| 6,254,176 B1 * | 7/2001 | Hare ................. 296/216.08 X |
| 6,267,430 B1 * | 7/2001 | Cresseaux ............ 296/65.01 X |

* cited by examiner

*Primary Examiner*—Dennis H. Pedder
(74) *Attorney, Agent, or Firm*—Carlson, Gaskey & Olds

(57) ABSTRACT

A rear motor drive sunroof assembly includes a window that is moved between open and closed positions on guide rails. Bus bars are molded into front and rear troughs of a sunroof frame and include a plurality of wires for connecting the sunroof drive motor to a vehicle body harness. Conductive electronic tape extends along one of the guide rails to interconnect the front and rear bus bars.

16 Claims, 3 Drawing Sheets

SUNROOF TROUGH MOLDED BUS BAR SYSTEM

BACKGROUND OF THE INVENTION

This invention relates a sunroof assembly with bus bars molded into front and rear troughs of a sunroof frame to electrically connect a rear mounted drive motor to a vehicle body harness.

Sunroof assemblies are powered by motors to move a window panel between open and closed positions. These motors are typically mounted at either the front or at the rear of the sunroof assembly. The rear mounting configuration requires long and extensive wiring harnesses to connect the motor to a vehicle body harness usually mounted near the front of the sunroof. One disadvantage with these long wiring harness is that tape and clips are needed to attach the harness to the sunroof frame. This type of attachment does often not adequately secure the harness and rattles and other undesirable noises can be generated as the clips or tape loosen. Further, the wires in the harness can be pinched resulting in the motor drive becoming inoperable.

For the above reasons, it would be desirable to provide a system for electrically connecting a rear mounted sunroof drive motor to a vehicle body harness in a secure fashion and in a manner that reduces rattles in addition to overcoming the other above mentioned deficiencies with the prior art.

SUMMARY OF THE INVENTION

A sunroof assembly for a passenger vehicle includes a frame member having front and rear troughs interconnected by guide rails. A window panel is supported for movement relative to the frame along the guide rails between open and closed positions. A drive motor provides the power to move the window and a bus bar is molded into at least one of the front and/or rear troughs to electrically connect the motor to a vehicle body harness.

In the preferred embodiment, the motor is mounted adjacent to the rear trough and a rear bus bar is molded within the rear trough and a front bus bar is molded within the front trough. Conductive tape interconnects the front and rear bus bars and preferably extends along at least one of the guide rails. The rear bus bar includes a plurality of wires for connection to the drive motor and the front bus bar includes a plurality of wires for connection to the vehicle body harness positioned near the front of the vehicle. The rear bus bar includes an integrally molded connector for connection to the motor and the front bus bar includes an integrally molded connector for connection to the body harness. The front and rear bus bars also include integrally molded connectors for connection to the conductive tape.

The subject invention provides method and apparatus for electrically connecting a rear mounted drive motor for a sunroof assembly to a vehicle body harness that is secure and reduces noise.

These and other features of the present invention can be best understood from the following specifications and drawings, the following of which is a brief description.

DETAILED DESCRIPTION OF A PREFERRED EMBODIMENT

Figure 1:
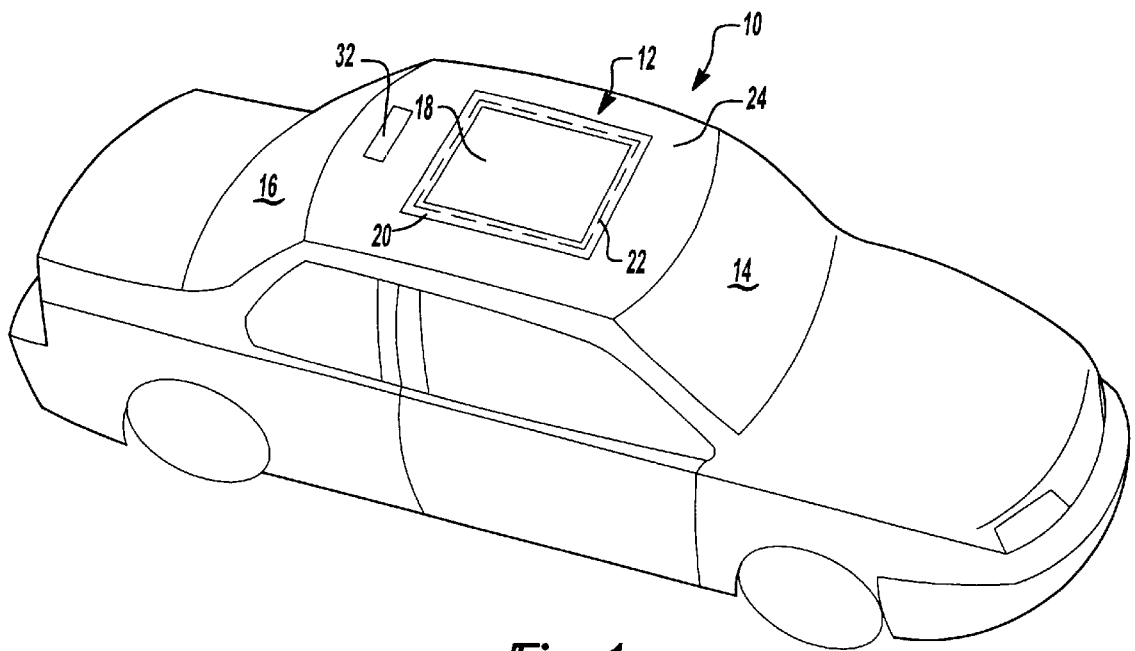
FIG. 1 is a schematic view of a vehicle with a sunroof assembly incorporating the subject invention.

FIG. 1 shows a vehicle 10 having a sunroof assembly, shown generally at 12 positioned between a front windshield 14 and a rear window 16. The sunroof assembly 12 includes a window panel 18 that is movable relative to a sunroof frame 20 that is installed within an opening 22 formed within a vehicle roof 24.

Figure 2:
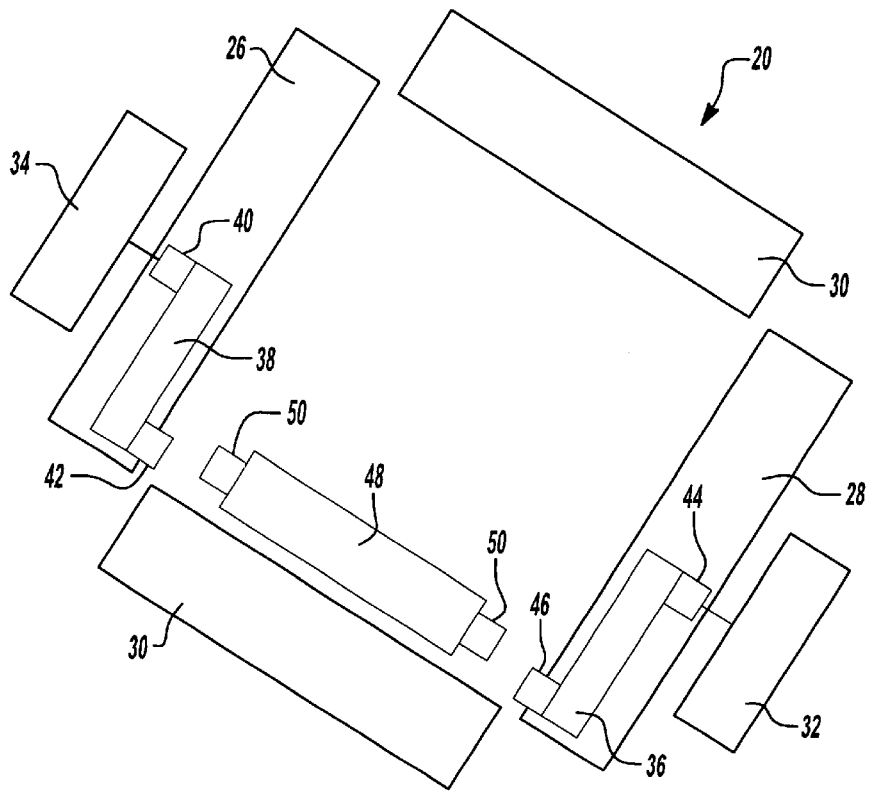
FIG. 2 is a schematic view of the sunroof frame shown in FIG. 1.

As shown schematically in FIG. 2, the sunroof frame 20 includes a front trough 26, a rear trough 28, and a pair of guide rails 30 that interconnect the front 26 and rear 28 troughs. A drive motor 32 is mounted adjacent to the rear trough 28 to provide power to move the window panel 18 relative to the frame 20 along the guide rails 30. The motor 32 is electrically connected to a vehicle body wire harness 34 that is typically located near the front of the vehicle 10. A rear bus bar 36 including a plurality of wires is electrically connected to the motor 32 and a front bus bar 38 including a plurality of wires is electrically connected to the vehicle body wire harness 34. The front 38 and rear 36 bus bars are integrally molded within the front 26 and rear 28 troughs, respectively.

Preferably, the guide rails 30 are made from a metal material and the troughs 26, 28 are made from a plastic material. Any type of metal or plastic material known in the art can be used. The bus bars 36, 38 are molded within the troughs 26, 28 by molding methods well known in the art.

The front bus bar 38 includes a first connector 40 at one end and a second connector 42 at an opposite end. The first connector 40 mates with the vehicle body wire harness 34. The rear bus bar 36 includes a first connector 44 that is connectable to the drive motor 32 at one end and a second connector 46 at an opposite end. Preferably the first 40, 44 and second 42, 46 connectors are integrally molded within the front 38 and rear 36 bus bars.

Preferably, conductive electronic tape 48 is used to electrically interconnect the front 38 and rear 36 bus bars. The tape 48 includes connectors 50 that are connectible to the second connectors 42, 46 of the front 38 and rear 36 bus bars. Preferably, the tape 48 extends along at least one of the guide rails 30. Any type of conductive electronic tape known in the art can be used to interconnect the bus bars 36, 38.

Figure 3:
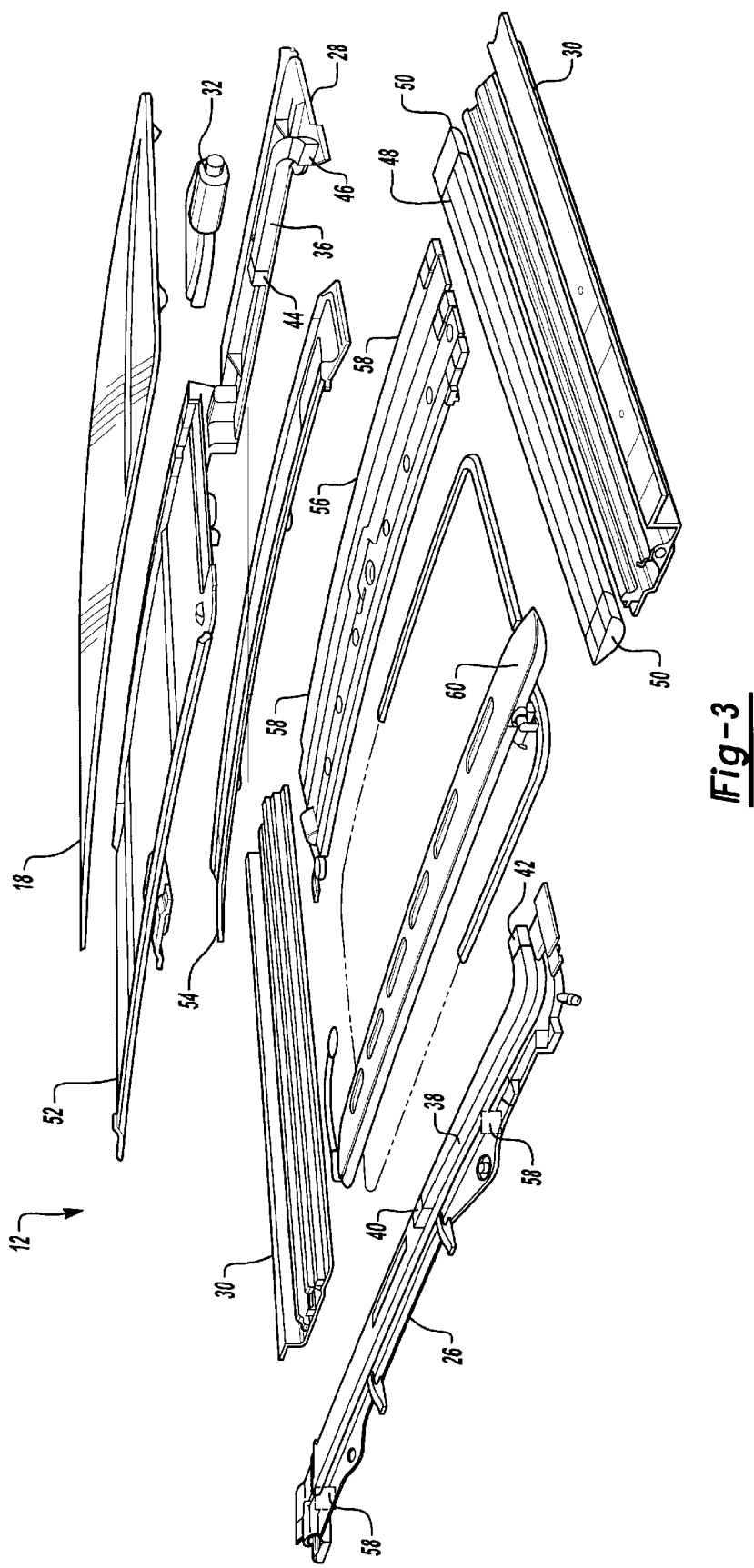
FIG. 3 is an exploded view of the sunroof assembly.

A more detailed view of the sunroof frame 20 is shown in FIG. 3. The guide rails 30 extend along the sides of the movable window panel 18 and interconnect the front 26 and rear 28 troughs. A sunshade 52 is preferably installed below the window panel 18 and is movable between open and closed positions to selectively cover the window panel 18. A water channel 54 is used to direct water away from the window panel 18. A traverse member 56 extends between the guide rails. Locking members 58 are mounted on the traverse member 56, the front trough 26, and the guide rails 30 to lock the window panel 18 into a desired position. The operation of the locking members 58 is well known and will not be discussed in detail. A wind deflector 60 is also preferably incorporated into the sunroof assembly 12.

Figure 4:
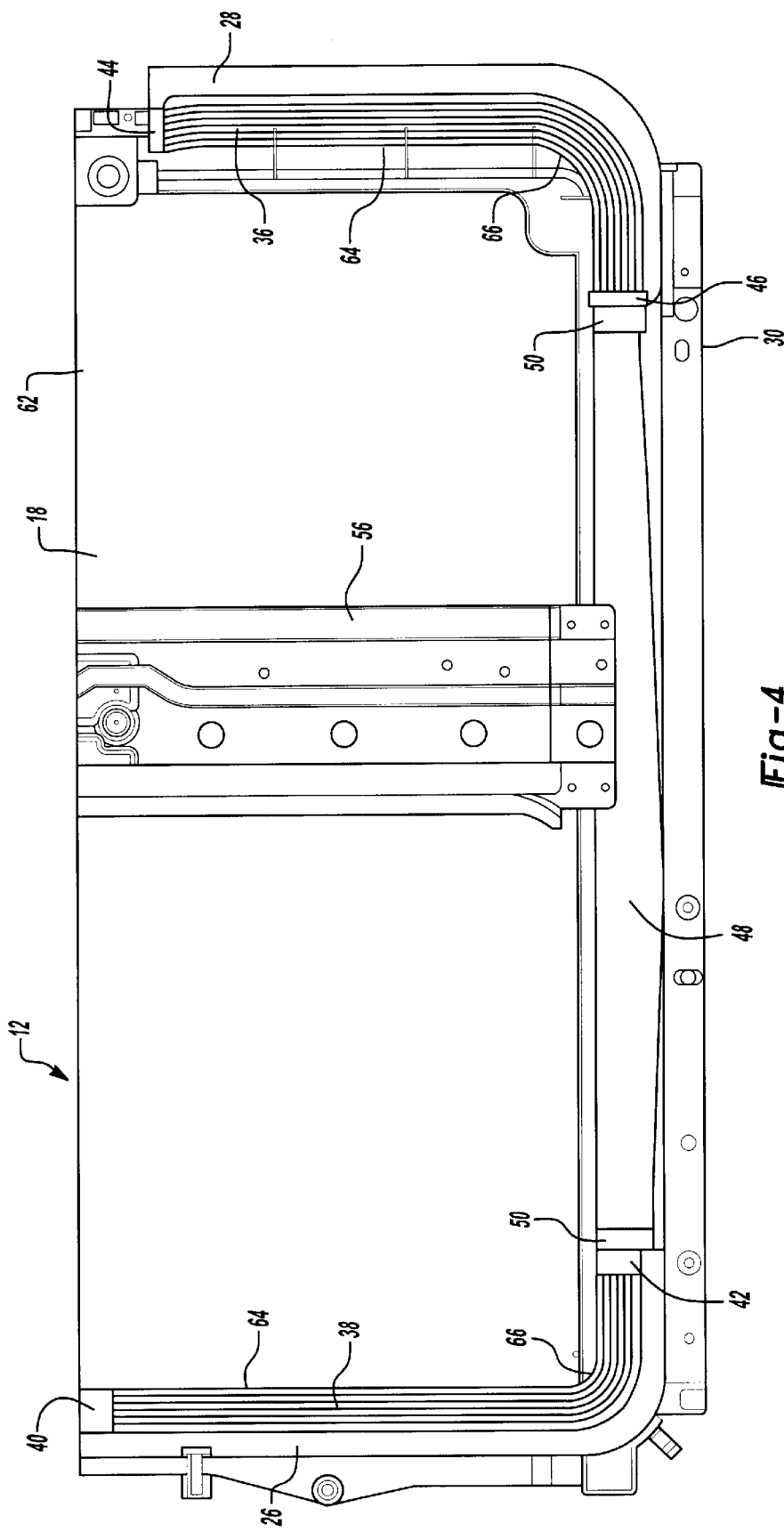
FIG. 4 is a top view, partially cut away, of the sunroof frame incorporating the subject invention.

As discussed above, the sunroof assembly 12 includes a front bus bar 38 integrally molded within the front trough 26 and a rear bus bar 36 integrally molded within the rear trough 28, as shown in FIG. 4. The window panel 18 defines a longitudinally extending axis 62 that runs parallel to the guide rails 30 and transverse to the front 26 and rear 28 troughs. The buses 36, 38 each include main body sections 64 and a curved corner section 66 that turns and extends parallel to the guide rails 30. The second connectors 42, 46 of the buses 36, 38 are thus, positioned along the guide rails 30 and are connectible to the connectors 50 of the conductive electronic tape 48.

Figure 5:
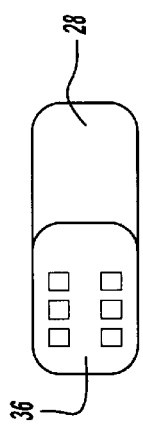
FIG. 5 is a schematic cross-sectional view of a rear bus bar molded into a rear trough.

As shown in the cross-sectional view of FIG. 5, the rear bus bar 36 is integrally molded within the rear trough 28 as one piece. The unitary bus bar 26 and trough 28 eliminate the need for a separate wiring harness. The front trough 28 and front bus bar 26 are similarly formed.

The method for installing a power system for a vehicle sunroof assembly 12 includes the following steps. Bus bars 36, 38 are molded into the rear 28 and front 26 troughs. One bus bar 36 is electrically connected to the motor 32 and the other bus bar 38 is electrically connected to the vehicle body harness 34. The bus bars 36, 38 are interconnected with conductive tape 48.

The use of integrally molded bus bars 36, 38 provides a secure electrical connection between the drive motor 32 and the body wire harness 34 while eliminating the need for a long and extensive wire harness for a rear mounted drive motor. This unique configuration also reduces undesirable noise generated by the attachment hardware used for securing the wire harnesses to the frame.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sunroof assembly comprising:
   a sunroof frame having front and rear troughs;
   a movable window supported relative to said frame;
   guide rails interconnecting said front and rear troughs for guiding said movable window between open and closed positions;
   a motor for powering said movable window along said guide rails; and
   at least one bus bar molded within at least one of said front and rear troughs and including a plurality of wires for electrically connecting said motor to a vehicle body harness.

2. An assembly according to claim 1 wherein said motor is mounted at said rear trough.

3. An assembly according to claim 1 wherein said at least one bus bar comprises a first bus bar molded within said rear trough and including a first plurality of wires for connection to said motor and a second bus bar molded within said front trough and including a second plurality of wires for connection to the vehicle body harness.

4. An assembly according to claim 3 including conductive tape for interconnecting said first and second bus bars.

5. An assembly according to claim 4 wherein said conductive tape extends along at least one of said guide rails.

6. An assembly according to claim 4 wherein said first bus bar includes a motor connector at one end and a first connector at an opposite end and said second bus bar includes a vehicle body harness connector at one end and a second connector at an opposite end, said conductive tape being connectable to and extending between said first and second connectors.

7. An assembly according to claim 6 wherein said motor connector and said first connector are integrally molded with said first bus bar as one piece and said vehicle body harness connector and said second connector are integrally molded with said second bus bar as one piece.

8. An assembly according to claim 1 wherein said movable window includes a front portion located adjacent to a vehicle windshield and a rear portion located adjacent to a vehicle rear window, said motor being mounted at said rear trough near said rear portion of said movable window.

9. An assembly according to claim 1 wherein said movable window defines a longitudinally extending central axis parallel to said guide rails and transverse to said front and rear troughs and wherein first and second bus bars include a curved corner portion that is parallel to said guide rails.

10. A sunroof assembly comprising:
    a sunroof frame including front and rear troughs interconnected by guide rails;
    a movable window mounted for movement relative to said frame along said guide rails between open and closed positions;
    a motor mounted adjacent to said rear trough for powering said movable window along said guide rails;
    a first bus bar molded within a portion of said rear trough; and
    a second bus bar molded within a portion of said front trough, said first and second bus bars including a plurality of wires for electrically connecting said motor to a vehicle body harness.

11. An assembly according to claim 10 including conductive electronic tape for interconnecting said first and second bus bars.

12. Am assembly according to claim 11 wherein said conductive electronic tape extends along one of said guide rails.

13. An assembly according to claim 12 wherein said first bus bar includes a first integrally molded connector and said second bus bar includes a second integrally molded connector with said conductive electronic tape being connectable to and extending between said first and second connectors.

14. An assembly according to claim 13 wherein said first and second bus bars include a main body portion parallel to said rear and front troughs and a curved comer portion that is parallel to said guide rails.

15. A method for installing a power system for a vehicle sunroof having a frame including front and rear troughs interconnected by guide rails and a window mounted for movement relative to the frame along the guide rails comprising the steps of:
    molding a first bus bar into the rear trough;
    molding a second bus bar into the front trough;
    electrically connecting the first bus bar to a motor;
    interconnecting the first and second bus bars with conductive tape; and
    electrically connecting the second bus bar to a vehicle body harness.

16. A method according to claim 15 including the step of mounting the motor at the rear trough.

* * * * *

UNITED STATES PATENT AND TRADEMARK OFFICE
CERTIFICATE OF CORRECTION

PATENT NO.    : 6,513,867 B1
DATED         : February 4, 2003
INVENTOR(S)   : Bess et al.

It is certified that error appears in the above-identified patent and that said Letters Patent is hereby corrected as shown below:

Column 4,
Line 36, "Am" should be -- An --.
Line 46, "comer" should be -- corner --.

Signed and Sealed this

Twenty-second Day of April, 2003

JAMES E. ROGAN
*Director of the United States Patent and Trademark Office*